UNITED STATES PATENT OFFICE 2,668,105

METHOD OF PRODUCING SPONGE IRON

Fredrik W. de Jahn, New York, N. Y., assignor of one-half to Alan N. Mann, Scarsdale, N. Y.

No Drawing. Application April 4, 1951,
Serial No. 219,325

9 Claims. (Cl. 75—.5)

This application relates to a method of producing sponge iron. By the term "sponge iron" I mean a porous mass of metal derived by the reduction of iron oxide without fusion. This necessarily means that the reaction is carried out at a relatively low temperature.

In the production of sponge iron it is not necessary that all of the oxygen be eliminated from the iron. In the ordinary manufacture of steel, pig iron is employed and the presence of some oxygen in the melting stock will assist in eliminating carbon from the pig iron. In this application I use the term "sponge iron" as meaning an iron oxide produced at low temperature so that not substantially more than about 30% of the original oxygen is present as iron oxide. Preferably more of the oxygen than this is eliminated, but I set this as the bottom limit. At the high end the iron may be substantially all reduced, as for example, in the production of iron powder for powder metallurgy. It is further understood that by the term "sponge iron" I do not mean that the mass must be pure iron and iron oxide. This term may be applied to reduced ores where appreciable quantities of silica or other impurities are still present.

This invention is based upon my discovery that certain carbohydrates can apparently be caused to react with iron oxide and then if conditions are maintained correct, the resulting compound can be decomposed in such a way that the oxygen, combined with the carbon or hydrogen of the carbohydrate, is eliminated with remarkable efficiency.

Not all carbohydrates are satisfactory for my purpose, and specifically the only ones which I have so far found which will serve are the sugars and lignin. Since the process contemplated is one which, to be valuable, must be carried out at relatively low cost, the pure sugars are substantially barred as uneconomic. Molasses contains large amounts of sugars and this gives the desired reactions but molasses ordinarily has a relatively high ash content which may be undesirable particularly in the case of iron powder, and molasses ordinarily contains substantial percentages of sulphur which is undesirable. However, molasses may be used where the ash and sulphur can be tolerated.

The most effective material to employ both from the point of view of the economics of the process and the results obtained comprises the products resulting from the treatment of woody bodies with hydrolyzing agents such as acid or high pressure steam. The process of producing wood sugar is well known and it can be applied to various forms of woody materials including bark, corn stalks and the like. The usual process produces wood sugar in solution and also produces a residue of lignin. While this lignin is not water-soluble, it can readily be combined with the finely ground iron oxide and the mixture made into a paste with water. This lignin when used in a paste does give desirable results and it is particularly useful in conjunction with wood sugar. By using the two combined, virtually all of the carbon of the wood is utilized. In the ordinary production of wood sugar about 360 pounds to 400 pounds of lignin are produced for each 1000 pounds of dry weight of wood sugar. Using the materials in their natural proportion gives good results but it is not necessary to use them in these proportions, and in fact some valuable results can be obtained if lignin is used alone. In general, the material which I prefer to use may be described as the carbohydrate material which results from the hydrolysis of woody material.

As stated above, the sponge iron to which this invention relates ordinarily should have at least 70% of its original oxygen removed, and this means that relatively high percentages of the carbohydrate material must be used. Thus even to get this minimum amount of reduction, I have found that at least 25% of dry weight of sugar solids must be employed (or the equivalent of other suitable carbohydrate) based on the weight of the iron oxide present in the ore. Accordingly I set this as the bottom limit of the amount of carbohydrate that should be employed but it is to be understood that steel makers ordinarily will want a greater degree of reduction and that ordinarily at least 28% or more of the carbohydrate will be used.

In order to get the necessary reaction, the iron ore should be crushed and finely ground. This does not offer any difficulty because ordinarily my process will be employed with ore concentrates. Customarily these concentrates are crushed and ground very fine so that the silica can be separated, as by the use of a wet magnetic separator. Such concentrates usually contain at least about 60% Fe and serve adequately for use with my invention. It is not even necessary to dry the concentrates if they are immediately available, for the soluble sugars should be used in solution, and if undissolved material like lignin is employed, I have found that preferably such material should be very finely divided so that it can be substantially dispersed in water and preferably enough water should be used to make up a paste of the iron oxide and carbohydrate. It must be borne in mind that if one is to get substantial reduction of the oxide, relatively large quantities of reducing agent must be employed and an extremely intimate mixture must be obtained. Apparently by using material in soluble or dispersible form with water present this intimate mixture is had. However, if the reducing agent and iron oxide are both very finely divided, some results of value may be obtained by mechanically mixing the ingredients dry and briquetting the mixture, though in general this is not as satisfactory as where water is used.

The wet paste should be dried at a temperature which is preferably at least 100° C. but at such temperature that no substantial decomposition of the carbohydrates takes place. This means that the drying temperature should certainly be lower than 250° C. and ordinarily not above 175° C. Apparently within the temperature range stated, as the water dries out some reaction or combination takes place between the carbohydrates and the iron. I have found that if the material is thoroughly dried and then weighed, a loss of weight occurs beyond that explained simply by the elimination of the free water that was present.

The drying may be done in any desired manner, with the one precaution that it should be so conducted that an approximately uniform mixture of the carbohydrate and iron ore is maintained without the ore settling out. For example, the mixture in pasty form can be put in a rotating cylinder through which a heating medium is passed. This heating medium may conveniently be in the form of products of combustion from some other operation. The cylinder should be provided with an internal scraper to prevent the sticky material from building up on the inside of the cylinder. Gradually as the paste dries, it will lose its stickiness and assume the form of hard pellets which are eminently suited for the next step in the process.

For the actual reduction, the dried mixture of iron oxide and carbohydrate is now raised to a temperature of about 1000° C. in any desired manner and preferably in a reducing atmosphere. One suggested way of doing this is to drop the material in lump form into the top of an externally heated shaft furnace. The temperature of this heating is rather critical and there are indications that benefits accrue from bringing the mixture up to the desired temperature quite quickly. The shaft furnace gives this effect.

It must be borne in mind that the carbohydrates employed will begin to decompose at a temperature in the order of about 250° C. but no appricable reduction of the iron oxide appears to take place until a temperature of about 900° C. is reached. For example, in one test a mass of material was made up containing about 25% of carbohydrate and this was heated to 900° C. An examination of the product showed that only 29% of the oxygen had been eliminated and 4% of free carbon was found in the product. By bringing such a mass rapidly up to a temperature of at least 950° C. and preferably about 1000° C. the nature of the reaction seems to change and as the carbohydrate radicals are decomposed, the oxygen of the iron ore is acted upon and volatilizes off. Thus if a study is made of the gases coming off from the heated mixture, it will be found that at 650° C. there is no appreciable amount of CO in the gas; at 900° C. the gas will show around 50% CO and at 1000° C. the CO percentage will go up to about 60%.

I have stated above that at least about 25% of sugar solids based on the weight of the iron oxide is necessary to drive off approximately 70% of the oxygen. Ordinarily in a reaction of this type one might expect it would be more and more difficult to drive off the remainder of the oxygen. Peculiarly enough, my observations have shown some evidence that as the percentage of carbohydrate is increased above 25%, its efficiency also increases, so that with an increase in the percentage of carhohydrate up to about 30% or more the amount of oxygen eliminated may be increased up to about 88% or even higher. With this efficiency, if the oxide employed is largely silica free, this product can be used for making powder for powder metallurgy.

Excess carbohydrate apparently does no harm (except that it introduces additional ash into the product) and the carbon is simply volatilized off. Therefore where ash is unimportant the only top limit on the amount of carbohydrate that may be employed is a matter of expense, but ordinarily there seems to be no occasion for using more than 50% of carbohydrate solids based on the weight of the iron oxide.

In carrying out my invention I have found that it is of some importance to have the dried mass of iron oxide and carbohydrate in the form of rather solid lumps when giving the final heating. In such case the outside of each lump obviously will get hot before the interior and even though the interior is below the proper reaction temperature when gases first start to evolve, these gases will act on the exterior of the lumps. It is also advantageous to have the heating chamber well filled with the material as this results in the furnace chamber being filled with a strongly reducing gas which assists in the reaction. As stated, the gases evolved at a temperature of 1000° C. ordinarily will contain about 60% CO.

While it is necessary to use a temperature of about 1000° C. in order to get the desired reaction, the temperature cannot be raised very much beyond this point, for sintering of the mass should be avoided. This means that for the ordinary iron ores the maximum is about 1150° C. In other words the temperature range for this heating should be between 950° C. and 1150° C. and preferably at about 1000° C.

I will now give some examples of my process but it is understood that these are given only for the purpose of illustration and to show the most efficient method known to me of carrying out the invention.

1. Taconite ore containing 28–34% Fe is crushed and ground in accordance with usual procedure so that 70% passes a 325-mesh screen. This fine material is then passed through a wet magnetic separator to give a concentrate containing 64–66% Fe and about 10% silica and other impurities. With each ton of such concentrate a 50% solution containing about 320 pounds dry weight wood sugar is mixed and 220 pounds of lignin (a residue from producing wood sugar) is added and thoroughly mixed in. Sufficient water is included to make a smooth paste.

This paste may be charged into a rotating cylinder fitted with a scraper and combustion gas at about 250° C. passed through. As the material advances in the cylinder, it forms pellets of from ¾ of an inch to 1½ inches in diameter and is thoroughly dried. As an alternative the paste may be extruded as a brittle rod and the extruded material broken into lumps and dried.

These pellets or lumps may be fed into the top of an externally heated shaft furnace which is maintained at a temperature of about 1000° C.

The treated product is withdrawn from the bottom after remaining in the furnace about three hours. The residue will be quite porous and contain about 82-84% Fe. In other words about 85% of the oxygen is eliminated. This makes an excellent melting stock for use in an electric furnace.

2. When making sponge iron to be used for producing iron powder, one should start with an ore concentrate from which substantially all the free silica has been eliminated (that is, it should contain less than .5% silica) or one may use mill scale. An example showing the production of iron powder is as follows:

New Jersey magnetite ore which had been concentrated so that it contained about 72% Fe and only about .2% silica, was mixed with wood sugar in the proportion of 44.8 parts of wood sugar solids and 100 parts by weight of the concentrate. The wood sugar was used in the form of a 50% solution making a rather thin paste. This was heated in pans at a temperature of 115° C. until there was no more evolution of water. The dried cake was about 2 inches thick and was broken up into lumps. These lumps were placed in an externally heated tube at a temperature of about 1000° C. and kept there for about 1½ hours. During this period there is initially a rapid evolution of gas containing about 60% CO but this evolution of gas had stopped at the end of 1½ hours.

The product of this treatment was in the form of porous lumps which on analysis were found to contain about 94% Fe, that is, about 88% of the oxygen had been removed. These lumps were then treated with hydrogen at a temperature of between 900° C. and 1000° C. to eliminate the balance of the oxygen and after cooling were ground in a hammer mill so that 100% passed through a 120-mesh screen and at least 45% passed through a 325-mesh screen. The resulting product was iron powder containing 97.9% Fe with an apparent density of between 2.1 and 2.2. On test, this iron powder was found to have very desirable characteristics for use in iron powder metallurgy.

In powdered form the material had an excellent flow and the apparent density stated is satisfactory for this purpose. When compressed and sintered in the usual fashion the product was found to have a remarkable degree of dimensional stability, that is, during the sintering process it showed no appreciable growth characteristic or shrinkage. This is important as in some instances it makes it possible to do away with the subsequent step of minting or coining to give final accurate size.

Also after sintering, the product was found to have good tensile strength and to show a good stretch or elongation before breaking on the tensile strength test.

I know of no other iron powder which combines all of these characteristics to such a high degree and apparently these characteristics are the result of the very efficient reduction incident to the employment of this process.

It is understood that the process may be modified in many particulars without departing from the spirit of my invention.

What I claim is:

1. The method of producing sponge iron which comprises combining with pulverized iron oxide sufficient carbohydrate material resulting from the hydrolysis of woody material, to give the desired degree of reduction, forming dry lumps of the mixture and heating the mixture to between 950° C. and 1150° C.

2. A method as in claim 1 in which the sugar material comprises wood sugar.

3. A method as in claim 1 in which the mixture is formed with enough water to make a paste and is dried to form lumps at a temperature not over 250° C.

4. A process of producing sponge iron which comprises incorporating with finely ground iron oxide an amount of carbohydrate material selected from the group consisting of molasses and carbohydrates resulting from the hydrolysis of woody material computed on a dry weight basis equal to between 25% and 50% of the weight of iron oxide together with sufficient water to form a paste, drying such paste at a temperature not in excess of 250° C. and low enough so that no substantial decomposition of the carbohydrate material takes place and then heating such mixture to a temperature of between 950° C. and 1150° C.

5. A process as specified in claim 4 in which the mixed materials are dried at a temperature in excess of 100° C. and in which the dried material is heated to between 950° C. and 1150° C. rapidly and as a separate operation.

6. A process of producing sponge iron which comprises incorporating with finely ground iron oxide an amount of carbohydrate material selected from the group consisting of wood sugars and lignins computed on a dry weight basis equal to between 25% and 50% of the weight of iron oxide, intimately mixing the two materials, forming dry lumps of the mixture and heating such lumps to a temperature of between 950° C. and 1150° C.

7. A process of producing sponge iron which comprises the steps of making a paste of finely ground iron ore containing at least 60% Fe, carbohydrate material resulting from the hydrolysis of woody material in an amount equal on a dry weight basis to between 25% and 50% of the weight of the ore and sufficient water to make a paste, drying such paste at a temperature of between 100° C. and 175° C. and then heating the dried material to a temperature of between 950° C. and 1150° C.

8. A process of producing sponge iron which comprises the steps of crushing and grinding iron ore, separating out free silica, incorporating with the resulting concentrate an amount of carbohydrate material resulting from the hydrolysis of woody material equal on a dry weight basis to at least 30% of the weight of the iron oxide, including sufficient water to form a paste, drying the mixture in lump form at a temperature of between 100° C. and 175° C. and heating the dry lumps to a temperature of about 1000° C. in a strongly reducing atmosphere.

9. A process as specified in claim 8 in which substantially all of the free silica is eliminated from the iron ore and which includes the further step of grinding up the resulting sponge iron to form iron powder.

FREDRIK W. DE JAHN.

References Cited in the file of this patent

UNITED STATES PATENTS

| Number | Name | Date |
|---|---|---|
| 374,560 | Saltery | Dec. 6, 1887 |
| 1,072,752 | McLarty | Sept. 9, 1913 |
| 2,014,873 | Wildman | Sept. 17, 1935 |
| 2,028,105 | Head | Jan. 14, 1936 |
| 2,441,594 | Ramsaver | May 18, 1948 |